United States Patent
Vazhkudai et al.

(10) Patent No.: US 12,141,068 B2
(45) Date of Patent: Nov. 12, 2024

(54) LOADING DATA IN A TIERED MEMORY SYSTEM

(71) Applicant: Micron Technology, Inc., Boise, ID (US)

(72) Inventors: Sudharshan Sankaran Vazhkudai, Austin, TX (US); Moiz Arif, Rochester, NY (US); Kevin Assogba, Rochester, NY (US); Muhammad Mustafa Rafique, Rochester, NY (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/941,704

(22) Filed: Sep. 9, 2022

(65) Prior Publication Data

US 2024/0086328 A1 Mar. 14, 2024

(51) Int. Cl.
*G06F 12/0862* (2016.01)

(52) U.S. Cl.
CPC .... *G06F 12/0862* (2013.01); *G06F 2212/602* (2013.01)

(58) Field of Classification Search
CPC .................. G06F 12/0862; G06F 2212/602
See application file for complete search history.

(56) References Cited

U.S. PATENT DOCUMENTS

| | | | |
|---|---|---|---|
| 11,048,591 B1 * | 6/2021 | Mamidi | G06F 16/2246 |
| 2012/0233310 A1 * | 9/2012 | Agarwala | G06F 11/3442 |
| | | | 709/224 |
| 2021/0049408 A1 * | 2/2021 | Roune | G06N 3/084 |
| 2021/0318965 A1 * | 10/2021 | Kumar | G06F 1/3225 |

* cited by examiner

*Primary Examiner* — Prasith Thammavong
(74) *Attorney, Agent, or Firm* — Holland & Hart LLP

(57) ABSTRACT

Methods, systems, and devices for loading data in a tiered memory system are described. A respective allocation of computing resources may be determined for each node in a cluster, where at least one of the nodes may include multiple memory tiers, and a data set to be processed by the nodes may be analyzed. Based on the allocation of computing resources and the analysis of the data set, respective data processing instructions indicating respective portions of the data set to be processed by respective nodes may be generated and sent to the respective nodes. The respective data processing instructions may also indicate a respective distribution of subsets of the respective portions of the data set across the multiple memory tiers at the respective nodes.

18 Claims, 9 Drawing Sheets

LOADING DATA IN A TIERED MEMORY SYSTEM

FIELD OF TECHNOLOGY

The following relates to one or more systems for memory, including loading data in a tiered memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

A computing system may be configured to analyze large sets of data (e.g., weather data, economic data, training data for a machine learning model, etc.). The computing system may include multiple tiers of memory, including a first tier of memory (e.g., DRAM) directly attached to a processor, a second tier of memory (e.g., DRAM) linked to the processor (e.g., via a compute express link (CXL)), a third tier of memory (e.g., SSD storage). Prefetching and caching techniques may be used to improve a performance of data processing by the computing system. Prefetching techniques may be used to load, into memory, a next set of data to be processed while another set of data is being processed. Caching techniques may be used to store, in onboard memory or an onboard storage location (e.g., SSD storage), processed data—e.g., that is scheduled to be reprocessed.

The prefetching and caching techniques may not take into account the different tiers of memory at a computing system. Thus, data may be prefetched into a lower-performance tier of memory when a higher-performance tier of memory is available, increasing latency for processing the prefetched data. Also, data may be cached into a third, low-performance tier of memory when an intermediate tier of memory is available for caching, increasing latency for accessing the cached data. Additionally, or alternatively, data may be cached into a high-performance tier of memory when an intermediate tier of memory is available for caching, using space in the high-performance tier of memory that would otherwise be available for prefetched data.

To improve the performance of data processing, prefetching and caching techniques that take into account different tiers of memory may be established. That is, prefetching and caching techniques may be established that result in to-be-processed data being placed close to processing threads in accordance with a processing urgency. For example, by prefetching training data that is due to be processed within a duration into a highest-performance tier of memory resources (e.g., high-performance, volatile memory), prefetching data that is due to be processed within a second duration into an intermediate-performance tier of memory resources (e.g., lower-performance, volatile memory), caching data that is due to be processed within a third duration into the intermediate-performance tier of memory resources, and so on.

Figure 1:
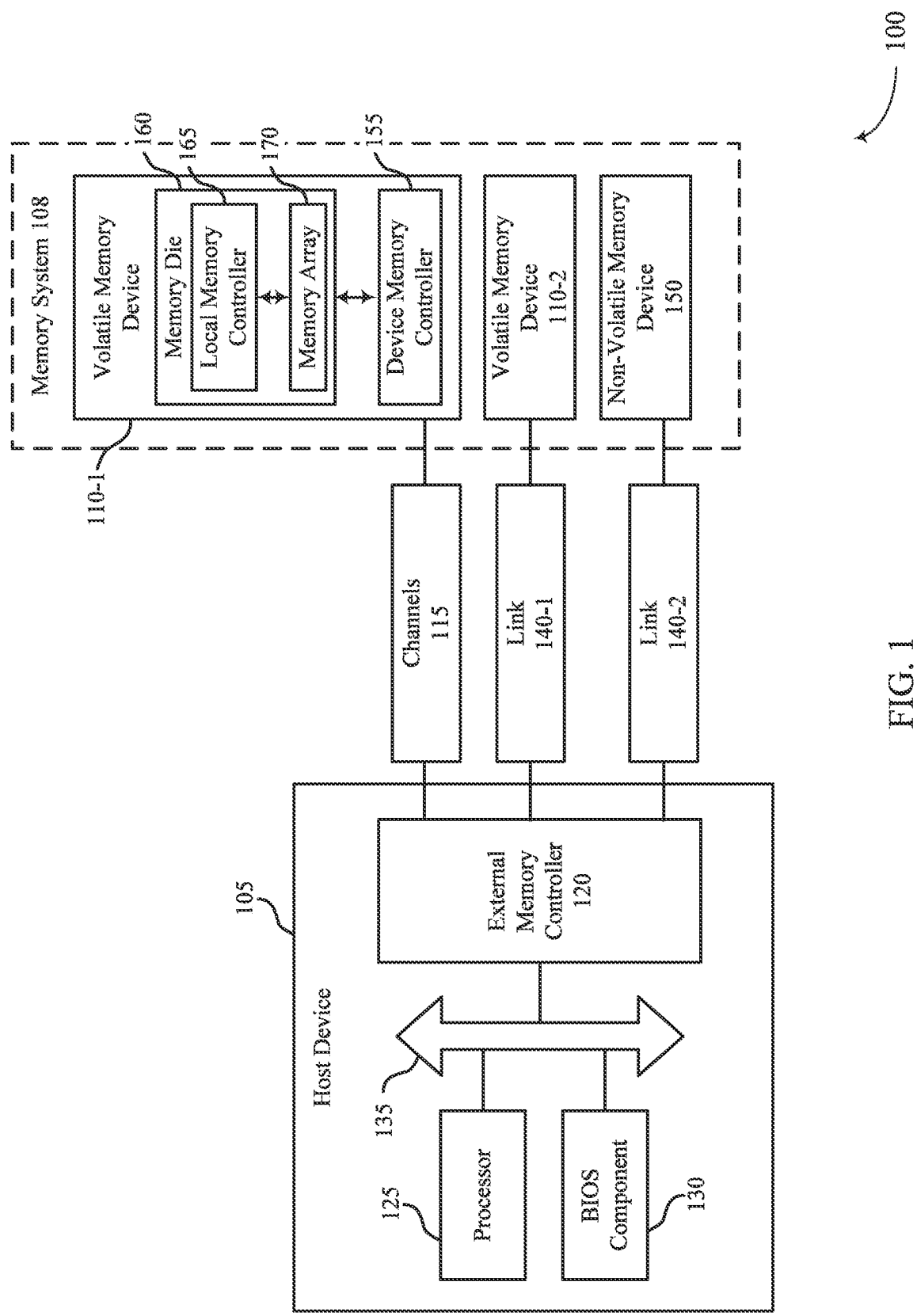
FIG. 1 shows an example of a system that supports loading data in a tiered memory system in accordance with examples as disclosed herein.

FIG. 1 shows an example of a system that supports loading data in a tiered memory system in accordance with examples as disclosed herein.

The system 100 may include a host device 105 and a memory system 108. The memory system 108 may include a first volatile memory device 110-1, a second volatile memory device 110-2, and a non-volatile memory device 150. One or more channels 115 may couple the host device 105 with the first volatile memory device 110-1. A first link 140-1 may couple the host device 105 with the second volatile memory device 110-2. And a second link 140-2 may couple host device 105 with the non-volatile memory device 150. The system 100 may include one or more of the first volatile memory devices 110-1, though aspects of the system 100 may be described herein in the context of a single memory device.

In some examples, the system 100 may include multiple host devices that are connected to multiple memory systems, where the memory systems may be configured differently or the same as the memory system 108. For example, a memory system may include channels and a volatile memory device that is similar to the first volatile memory device 110-1 as well as a link and non-volatile memory device similar to second link 140-2 and non-volatile memory device 150. Another memory system may include channels and a volatile memory device that is similar to the second volatile memory device 110-2 as well as a link and non-volatile memory device similar to second link 140-2 and non-volatile memory device 150. Another memory system may include channels and a volatile memory device that is similar to the first volatile memory device 110-1 as well as a link and volatile memory device that is similar to the first link 140-1 and the second volatile memory device 110-2. Each of the multiple host device/memory system combinations may be referred to as a computing node in a cluster.

The system 100 may include portions of an electronic device, such as a computing device, a mobile computing device, a wireless device, a graphics processing device, a vehicle, or other systems. For example, the system 100 may illustrate aspects of a server, computer, a laptop computer, a tablet computer, a smartphone, a cellular phone, a wearable device, an internet-connected device, a vehicle controller, or the like. The first volatile memory device 110-1 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

In some examples, the system 100 or the host device 105 may include various peripheral components. The peripheral components may be any input device or output device, or an interface for such devices, that may be integrated into or with the system 100 or the host device 105. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral.

In some examples, the system 100 or the host device 105 may include an I/O controller. An I/O controller may manage data communication between the processor 125 and the peripheral component(s) (e.g., input devices, output devices). The I/O controller may manage peripherals that are not integrated into or with the system 100 or the host device 105. In some examples, the I/O controller may represent a physical connection (e.g., one or more ports) with external peripheral components.

In some examples, the system 100 or the host device 105 may include an input component, an output component, or both. An input component may represent a device or signal external to the system 100 that provides information (e.g., signals, data) to the system 100 or its components. In some examples, an input component may include an interface (e.g., a user interface or an interface between other devices). In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The first volatile memory device 110-1 may be an independent device or a component that is operable to provide physical memory addresses/space that may be used or referenced by the system 100. In some examples, the first volatile memory device 110-1 may be configurable to work with one or more different types of host devices. Signaling between the host device 105 and the first volatile memory device 110-1 may be operable to support one or more of: modulation schemes to modulate the signals, various pin configurations for communicating the signals, various form factors for physical packaging of the host device 105 and the first volatile memory device 110-1, clock signaling and synchronization between the host device 105 and the first volatile memory device 110-1, timing conventions, or other functions.

The first volatile memory device 110-1 may be operable to store data for the components of the host device 105. In some examples, the first volatile memory device 110-1 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The first volatile memory device 110-1-1 may include a device memory controller 155 and one or more memory dies 160 (e.g., memory chips) to support a capacity (e.g., a desired capacity, a specified capacity) for data storage. Each memory die 160 may include a local memory controller 165 and a memory array 170. A memory array 170 may be a collection (e.g., one or more grids, one or more banks, one or more tiles, one or more sections) of memory cells, with each memory cell being operable to store one or more bits of data. A first volatile memory device 110-1 including two or more memory dies 160 may be referred to as a multi-die memory or a multi-die package or a multi-chip memory or a multi-chip package.

The device memory controller 155 may include components (e.g., circuitry, logic) operable to control operation of the first volatile memory device 110-1. The device memory controller 155 may include hardware, firmware, or instructions that enable the first volatile memory device 110-1 to perform various operations and may be operable to receive, transmit, or execute commands, data, or control information related to the components of the first volatile memory device 110-1. The device memory controller 155 may be operable to communicate with one or more of the external memory controller 120, the one or more memory dies 160, or the processor 125. In some examples, the device memory controller 155 may control operation of the first volatile memory device 110-1 described herein in conjunction with the local memory controller 165 of the memory die 160. The second volatile memory device 110-2 may be configured similarly as the first volatile memory device 110-1.

The external memory controller 120 may be operable to enable communication of information (e.g., data, commands, or both) between components of the system 100 (e.g., between components of the host device 105, such as the processor 125, and the first volatile memory device 110-1). The external memory controller 120 may process (e.g., convert, translate) communications exchanged between the components of the host device 105 and the first volatile memory device 110-1. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the first volatile memory device 110-1, in some examples, the external memory controller 120, or its functions described herein, may be implemented by one or more components of a first volatile memory device 110-1 (e.g., a device memory controller 155, a local memory controller 165) or vice versa.

The components of the host device 105 may exchange information with the first volatile memory device 110-1 using the one or more channels 115. The one or more channels 115 may be operable to support communications between the external memory controller 120 and the first volatile memory device 110-1. Each of the one or more channels 115 may be an example of a transmission medium that carries information between the host device 105 and the first volatile memory device 110-1. Each of the one or more channels 115 may include one or more signal paths (e.g., a transmission medium, a conductor) between terminals associated with the components of the system 100. A signal path may be an example of a conductive path operable to carry a signal. For example, a channel of the one or more channels 115 may be associated with a first terminal (e.g., including one or more pins, including one or more pads) at the host device 105 and a second terminal at the first volatile memory device 110-1. A terminal may be an example of a conductive input or output point of a device of the system 100, and a terminal may be operable to act as part of a channel.

The one or more channels 115 (and associated signal paths and terminals) may be dedicated to communicating one or more types of information. For example, the one or more channels 115 may include one or more command and address (CA) channels, one or more clock signal (CK) channels, one or more data (DQ) channels, one or more other channels, or any combination thereof. In some examples, signaling may be communicated over the one or more channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal). The one or more channels 115 may support the exchange of data with low-latency (e.g., less than 20 nanoseconds) at a high data rate (e.g., greater than 3.2 Gbps), where the first volatile memory device 110-1 may be capable of communicating data with a similarly low-latency and data rate.

The components of the host device 105 may exchange information with the second volatile memory device 110-2 using first link 140-1. First link 140-1 may support the exchange of data with low-latency at a high data rate—e.g., that is similar to the one or more channels 115. For example, first link 140-1 may be a compute express link. In some examples, the second volatile memory device 110-2 may be a lower-performance version of the first volatile memory device 110-1—e.g., to reduce costs. Accordingly, the first volatile memory device 110-1 may be categorized as a first tier of memory and the second volatile memory device 110-2 may be categorized as a second tier of memory.

The components of the host device 105 may exchange information with the non-volatile memory device 150 over second link 140-2. Second link 140-2 may support the exchange of data with a higher-latency than the one or more channels 115 and the first link 140-1—e.g., at latency around seventy microseconds for solid state drives and 10 milliseconds for hard drives. For example, second link 140-2 may be a serial advanced technology attachment (SATA) link. The non-volatile memory device 150 may communicate data with higher latencies and lower data rates than the first volatile memory device 110-1 and the second volatile memory device 110-2. That said, the non-volatile memory device 150 may also be a more cost-effective form of memory than the first volatile memory device 110-1 and the second volatile memory device 110-2. Thus, the non-volatile memory device 150 may be recategorized as a third tier of memory.

In some examples, the first volatile memory device 110-1 is configured as a main memory for the host device 105, where the first volatile memory device 110-1 may be used as dynamic random access memory by the host device 105. The second volatile memory device 110-2 may also be configured as a cache-coherent main memory for the host device 105. Based on having cache-coherency, the second volatile memory device 110-2 may be accessed within a same address space as the first volatile memory device 110-1— though, in some examples, data may be accessed from the second volatile memory device 110-2 with a higher latency than the first volatile memory device 110-1. The non-volatile memory device 150 may be configured as a long-term storage location for the host device 105. In some examples, the host device 105 is configured to selectively provide users access to the different tiers of memory—e.g., in accordance with service level agreements. For example, the host device 105 may allocate a portion of the first volatile memory device 110-1, a portion of the second volatile memory device 110-2, and a portion of the non-volatile memory device 150 to a customer. The size of the portions may be based on a fee paid by the customer—e.g., for a higher fee, a customer may be given a larger portion of the first volatile memory device 110-1; for an intermediate fee, the customer may be given a smaller portion of the first volatile memory device 110-1 and a larger portion of the second volatile memory device 110-2; for a lower fee, the customer may only be given a portion of the second volatile memory device 110-2, and so on.

In some examples, the system 100 may be used to analyze massive data sets, implement a machine learning model, or the like. In such cases, the system 100 may include a cluster of computing nodes, where each computing node may be configured with individual computing resources (e.g., one or more processor cores), network resources, volatile memory resources, and non-volatile memory resources. In some examples, the computing nodes are physically separated from one another and use physically separated resources. In other examples, the computing nodes are logically separated from one another and are allocated portions of the same resources. In some examples, different computing nodes may be associated with different tiers of memory. For example, one computing node may include higher-performance memory resources (e.g., the first volatile memory device 110-1) and another computing node may include lower-performance memory resources (e.g., the second volatile memory device 110-2).

In some examples, machine learning software (e.g., Tensorflow, PyTorch, etc.) is installed on the system 100. As part of a machine-learning workflow, one of the computing nodes may be designated as a managing node and the other nodes may be designated as worker nodes. Also, a workload including large sets of training data for a model may be loaded into the system 100 (e.g., from a network-attached storage that has a connection to the system 100). The managing node may partition the training data into portions (which may be referred to as shards) that are allocated to respective computing nodes of the system 100. Based on partitioning the training data, the managing node may send the shards to the respective computing nodes. Each shard may include multiple batches of data to be processed by a computing node. In some examples, the computing nodes may preprocess batches of training data (e.g., convert the data objects in the training data from one type to another) before using the preprocessed batches of training data to train a model. In some examples, a size of a preprocessed batch of data may be larger than a size of a batch of training data. In some examples, the training data may be applied to the model multiple times during multiple training periods, where each training period may be referred to as an epoch. In some examples, the latency of a machine-learning workflow is heavily influenced by I/O operations, including the transfer of training data from a network-attached storage to the computing nodes.

To reduce the latency of a machine-learning workflow, the machine learning software may use a prefetching technique that is used to load batches of training data while other batches of training data are being processed—e.g., the next set of batches to be processed. The prefetched batches of data may be stored in buffers established by the machine-learning software for prefetched data. Additionally, or alternatively, to further reduce the latency of a machine-learning workflow, the machine-learning software may use a caching technique that is used to store previously processed batches of training data (e.g., preprocessed training data) while other batches of data are being processed. For example, the batches of training data may be stored in the main memory (if the main memory is large enough to store the full data set), in an SSD storage location, or a combination thereof. Accordingly, if the data is to be reprocessed (e.g., in the same or a following epoch), the batches of training data may be quickly accessed from or loaded into a main memory location of the system 100 for processing—e.g., without reloading the training data from the network-attached storage.

The prefetching and caching techniques of the machine-learning software may fail to take into account the different tiers of memory at a system 100. For example, the machine-learning software may prefetch data into lower-performance volatile memory (e.g., the second volatile memory device 110-2) when higher-performance volatile memory (e.g., the first volatile memory device 110-1) is available. In some examples, the latency of the machine-learning workflow may also be significantly increased when non-volatile memory (e.g., an SSD) is used to cache the received training data. Additionally, or alternatively, the machine-learning software may degrade the performance of the machine-learning process by caching data in higher-performance volatile memory (e.g., the first volatile memory device 110-1) when lower-performance volatile memory is available (e.g., the second volatile memory device 110-2), preventing to-be-processed training data from being prefetched into the higher-performance volatile memory.

To improve the performance of a machine-learning implementation, prefetching and caching techniques that take into account different tiers of memory may be established. That is, prefetching and caching techniques may be established that result in to-be-processed training data being placed close to processing threads in accordance with a processing urgency. For example, by prefetching training data that is due to be processed within a duration into a first tier of memory resources (e.g., high-performance, volatile memory), prefetching training data that is due to be processed within a second duration into a second tier of memory resources (e.g., lower-performance, volatile memory), caching training data that is due to be processed within a third duration into the second tier of memory resources, and so on.

In some examples, the system 100 (which may be a managing node of a cluster) may determine a computing resource classification for each node in the cluster, where at least one of the nodes may include multiple tiers of memory. For example, the system 100 may determine a first node in the cluster has a four-core processor, 8 GB of first tier memory, 16 GB of second tier memory, 256 GB of storage, and is capable of supporting a particular generation of a network protocol. The system 100 may also analyze a data set (which may also be referred to as a workload) to be processed by the cluster. The data set may include a collection of data objects (e.g., text documents, pdf documents, images, videos, sensor data, economic data, or any combination thereof). In some examples, the system 100 may determine a size of the data set, a type of data (e.g., documents, images, videos, etc.) in the data set, and the like.

Based on the computing resource classification and determined characteristics of the data set, the system 100 may generate, for each node, a set of data processing instructions. A set of data processing instructions for a node (that includes multiple tiers of memory) may indicate a respective portion of the data set (which may be referred to as a shard) to be processed by the node as well as a process for processing (e.g., prefetching and caching) the subsets of the shard across the tiers of memory at the node. The system 100 may then send the respective sets of the data processing instructions to respective nodes of the cluster. By generating data processing instructions that take into account tiers of memory, a performance of a data processing process (e.g., data analysis, machine learning model training, etc.) may be improved.

In some examples, a second system (which may be configured the same or similarly as the system 100) may receive a set of data processing instructions generated by the system. The second system may store subsets of a received shard in corresponding tiers of memory at the second system and may process the subsets of the shard accordingly. By storing subsets of a shard in tiers of memory in accordance with a set of data processing instructions, an operation for processing the shard may be improved.

Figure 2:
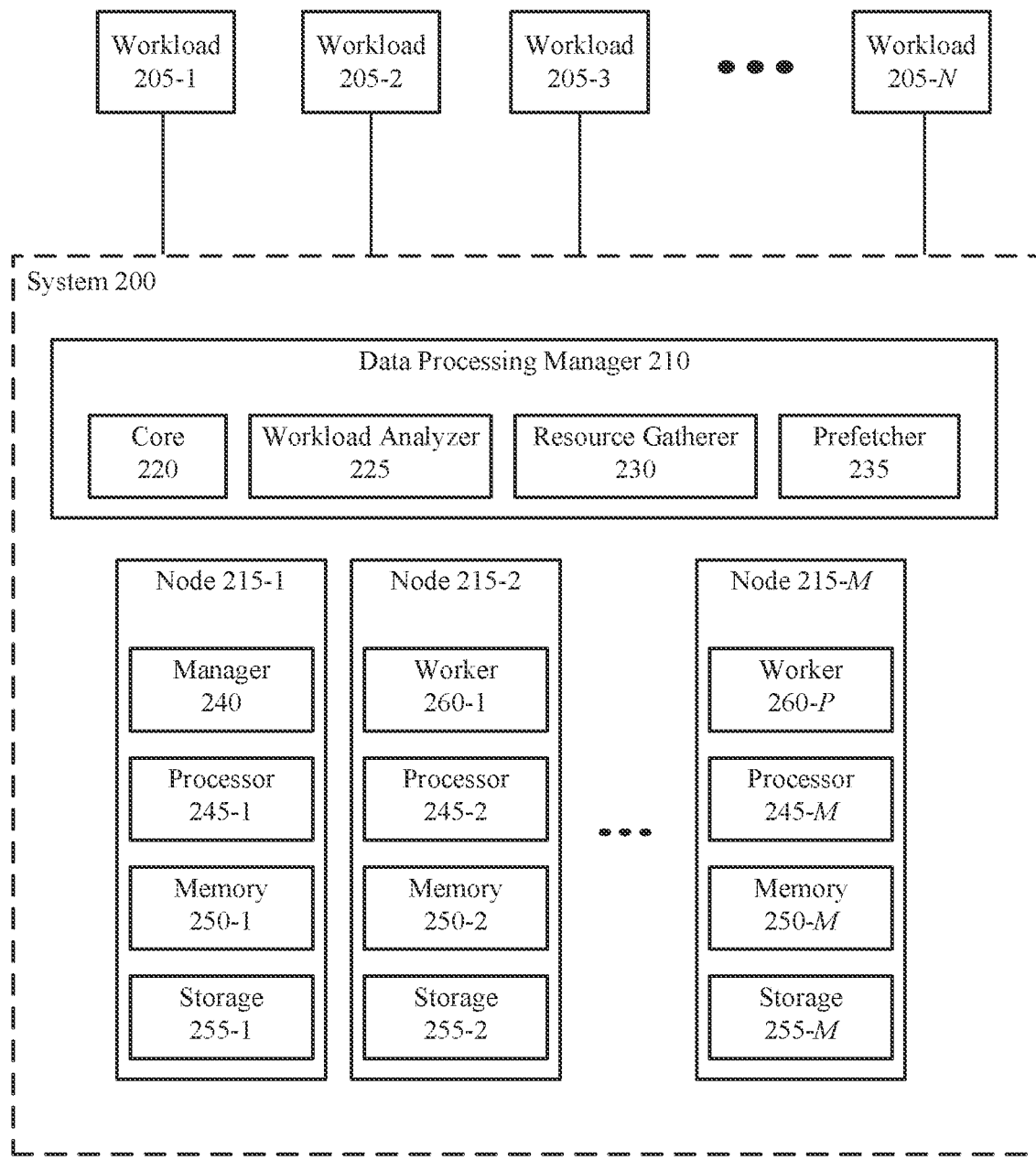
FIG. 2 shows an example of a system that supports loading data in a tiered memory system in accordance with examples as disclosed herein.

FIG. 2 shows an example of a system that supports loading data in a tiered memory system in accordance with examples as disclosed herein.

The system 200 may be configured as a cluster that includes multiple computing nodes (e.g., the nodes 215) and that is used to process data sets (e.g., in the workloads 205). System 200 may include the nodes 215 and the data processing manager 210.

The nodes 215 may be configured to individually process portions of a data set. Accordingly, the nodes 215 may each be configured with a respective processor, memory, and storage. The processors 245 may be configured to retrieve and process data stored in the respective nodes 215. The memory 250 may store data to be processed by the processors 245, and may be configured so that the processors 245 may access the memory with low latency. The storage 255 may also be configured to store data to be processed by the processors 245, but may be accessed with a higher latency than the memory 250.

The memory of a node (e.g., the first memory 250-1 of the first node 215-1) may be a tiered memory system. For example, the first memory 250-1 may include, in a first tier of memory, a first DRAM (e.g., a volatile memory) that is attached directly to the first processor 245-1—e.g., that is inserted into a DIMM slot on the same motherboard as the first processor 245-1. And, in a second tier of memory, the first memory 250-1 may include a second DRAM (e.g., a volatile memory) that is indirectly attached to the first processor 245-1 via a link to the node—e.g., via a CXL interface. In some examples, a latency associated with accessing the second DRAM may be higher than a latency associated with accessing the first DRAM. Additionally, or alternatively, the second DRAM may use a lower-performance, but more cost-effective, technology than the first DRAM. In such cases, the first storage 255-1 may be considered a third-tier of lower-performance, but more cost-effective, memory than both the first tier and second tier of memory. The first storage 255-1 may include a hard disk drive or solid state drive (e.g., a non-volatile memory) that is indirectly attached to the processor via a link to the node—e.g., via a SATA interface.

The memory of other nodes of the nodes 215 may not be a tiered memory system—e.g., may include a single memory device and a single storage device. In some examples, the memory device at a node with a tiered memory system may be a higher performance memory device than a memory device at another node with a non-tiered memory system.

The data processing manager 210 may be configured to determine a plan for processing a data set of a workload (e.g., the first workload 205-1) based on determined characteristics of the nodes 215 and determined characteristics of the workload. In some examples, the data processing manager 210 may determine the plan based on receiving a request to perform a job that involves processing a workload. Processing a workload may include transferring the data set of the workload into the nodes (which may be categorized as I/O operations) and processing the data set (which may be categorized as computing operations). In some examples, a majority of the duration for completing a job is allocated to the I/O operations.

The data processing manager 210 may include the core 220, the workload analyzer 225, the resource gatherer 230, and the prefetcher 235. In some examples, aspects of the data processing manager 210 are implemented in one of the nodes 215 (e.g., the first node 215-1) or distributed across the nodes 215. For example, the core 220 may be implemented in the manager 240 and the workers 260 while the workload analyzer 225, the resource gatherer 230, and the prefetcher 235 may be implemented in the manager 240. The system 200 may be an example of a system 100 described with reference to FIG. 1.

The resource gatherer 230 may be configured to determine computing characteristics of the nodes 215 and to classify, individually, collectively, or both, the nodes 215 into tiers of memory. For example, the resource gatherer 230 may capture information about the compute, memory, network, and storage resources of all of the nodes 215. The resource gatherer 230 may maintain a list of hardware specification of the nodes, including processor make, model, caches, interface, and the like. The resource gatherer 230 may also be configured to maintain information, for the nodes, about the installed memory, memory channels, memory controllers, and supported memory speeds. Additionally, the resource gatherer 230 may store, for the nodes, information about the locally attached storage and the mount points on the system. The resource gatherer 230 may be further configured to maintain up-to-date information about the available system resources on all of the nodes 215.

The resource gatherer 230 may also be configured to use the obtained computing information to classify the nodes into tiers of memory. In some examples, the resource gatherer 230 is configured to classify the nodes into tiers of memory based on performance statistics, such as total achievable bandwidth, input/output operations per second, and latency. To determine the performance statistics, the resource gatherer 230 may be configured to run benchmarking tests (such as LMBench, FIO, and STREAM).

The workload analyzer 225 may be configured to analyze aspects of job for completing a workload, which may include isolating the I/O operations of the job from the computing operations of the job. The workload analyzer 225 may capture model-specific information for a job, such as a deep learning model used, parameters, the associated dataset, epoch details, batch size details, pre-processing details, and training details. The workload analyzer 225 may also identify if a checkpoint or data caching option is enabled for the submitted job—e.g., when used with Tensorflow. The workload analyzer 225 may also divide the job into two phases, data processing and model execution. The data processing phase may include loading data sets, pre-processing, and any other data set operations for the job. The model execution phase may include executing the model code and the training process. Additionally, the workload analyzer 225 may track the size of each batch based on a training job, and may track each shard of the data set assigned to the nodes 215. The workload analyzer 225 may use the tracking information to estimate the memory and storage allocation on each node and to accurately determine a completion time for prefetching data into the memory tiers.

The core 220 may be configured to supervise the performance of a job for processing a data set of a workload. The core 220 may include a first part (which may be implemented at the manager 240) and a second part (which may be implemented at the workers 260. The portion of the core 220 implemented at the manager 240 may be configured to supervise all of the functions for performing the job and may generate instructions for processing the workload. The portion of the core 220 implemented at the workers 260 may be configured to perform tasks, such as monitoring local buffers, prefetching data, and caching data, as instructed by the manager 240. The portion of the core 220 implemented at the manager 240 may use information obtained from the other components of the data processing manager 210 to determine data processing instructions for the nodes. In some examples, the core 220 provides an application program interface that can be used by workloads to request memory space.

The portion of the core 220 implemented at the manager 240 may also be configured to coordinate the preparation and pre-processing of a data set and ensure that each training batch is loaded into memory before a corresponding processing thread is executed. The portion of the core 220 implemented at the manager 240 may also be configured to increase a performance of a data pre-processing phase by making data available to training processes on the closest and fastest storage media and, after the second epoch, ensuring the training processes have data prefetched before the start of the next epoch. The portion of the core 220 implemented at the manager 240 may also be configured to monitor CXL memory allocations on all of the nodes 215. The portion of the core 220 implemented at the manager 240 may also be configured to determine an eviction strategy for the buffers at each memory and storage tier. Techniques for caching data are described in more detail herein, including with reference to FIG. 5.

The prefetcher 235 may be configured to receive instructions from the core 220 and to execute a prefetching schedule indicated by the instructions. The schedule may include information about the allocated nodes for running a training process, an assigned chunk of a data set, memory and scratch space allocation, and a resource map for data placement for training a DL mode. The prefetcher 235 may be implemented across the nodes 215. Techniques for prefetching data are described in more detail herein, including with reference to FIG. 4.

Figure 3:
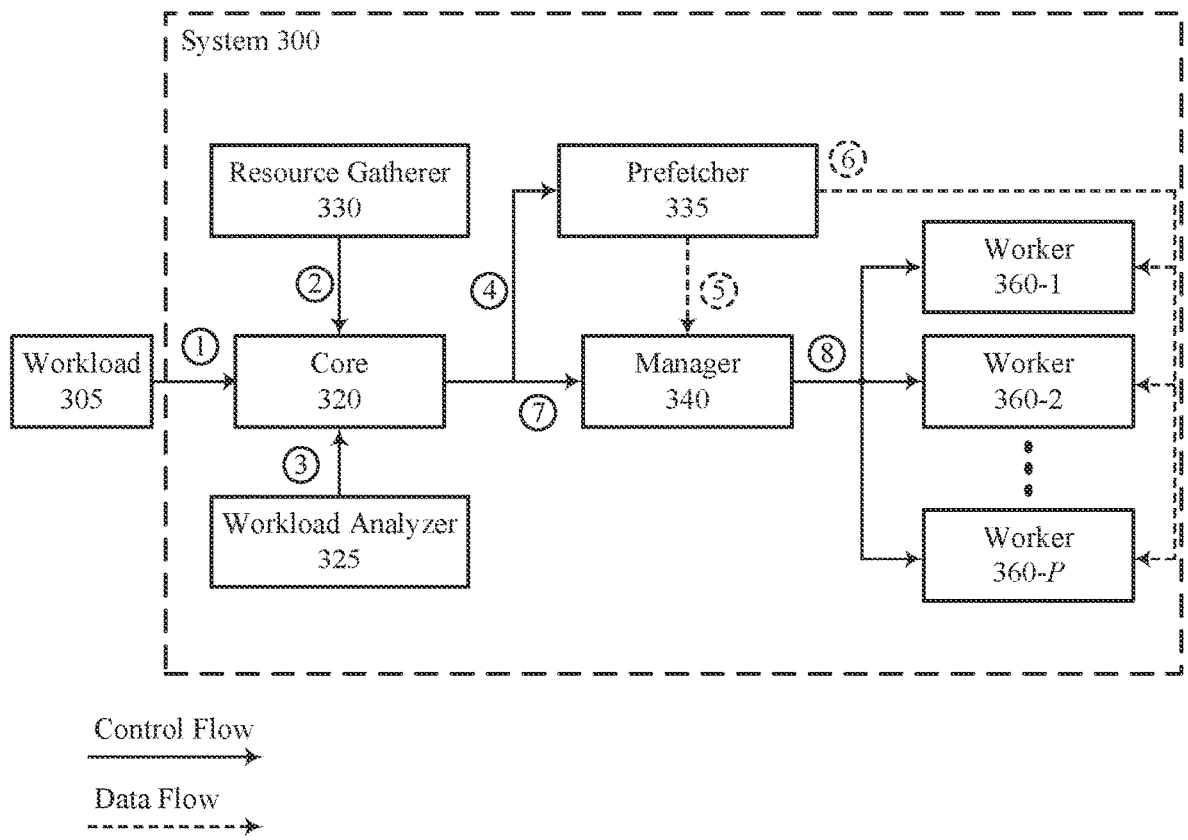
FIG. 3 shows an example of a workflow that supports loading data in a tiered memory system in accordance with examples as disclosed herein.

FIG. 3 shows an example of a workflow that supports loading data in a tiered memory system in accordance with examples as disclosed herein.

The workflow 301 may depict a flow of control information and data through a system 300. A request to process a workload 305 may be received at the core 320—e.g., via an API. In some examples, the request includes a request for memory space. In response to receiving a memory request, the manager 340 may fetch resource availability data, determine an execution strategy for the job, and begin the job.

The manager 340 may define prefetching and caching buffer sizes at each memory tier on the nodes—e.g., based on resource information received from the resource gatherer 330 and the workload analyzer 325. In some examples, the buffers may be adaptable to handle batches with varying sizes. A batch may contain n elements of dimensions ($x_i$, $y_i$, $z_i$) which may be stored in memory as arrays of $d_i$ bytes objects. A size $S_b$ of a batch b may be computed as $S_b = \Sigma_{i=1}^{n} x_i \times y_i \times z_i \times d_i$. The manager 340 may work closely with the prefetcher 335 to ensure that appropriate buffers are allocated. In some examples, the manager 340 may start with a reservation of 20% of available space at a first memory tier but may adjust the allocation of a size $S_t$ of a buffer in a tier based on the available space at the tier and the total number of batches, B, scheduled to be loaded onto the tier such that $B \times S_b \leq S_t$. The sizes of the buffers may increase from faster tiers to slower tiers of memory—e.g., under the assumption that the fastest tier of memory is the most expensive and scarce.

Based on information received from the workload analyzer 325, the manager 340 may determine a schedule and deadlines for input/output operations for staging the dataset in the main memory of the nodes. The dataset may initially be stored in a cold storage tier (e.g., a network-attached storage mounted on a server. The manager 340 may locate the dataset and create a schedule that ensures that the initial dataset for the data pre-processing phase is loaded into the main memory to reduce input/output stalls. After the data is pre-processed, the schedule may include instructions for staging the pre-processed data in the memory. If the pre-processed data is larger than the capacity of the first memory tier (e.g., direct-attached DRAM), then the data may be cached in a second memory tier (e.g., CXL-attached DRAM). In some examples, the data prefetching and caching may be performed in accordance with the following:

| Data Prefetching and Caching Scheduling |
| --- |
| 1:   for each worker in cluster do |
| 2:     determine location for n batches |
| 3:     if tier t avail. buffer space ≥ space for n batches then |
| 4:       prefetch n batches from location x to tier t |
| 5:     else |
| 6:       prefetch (n − k) batches from location x to tier f |
| 7:       prefetch k batches from location x to tier t − 1 |
| 8:     end if |
| 9:     if buffer space in tier t ≥ util. threshold at tier t then |
| 10:       if batch b is needed in upcoming i iterations then |
| 11:         cache batch b to tier t − 2 |
| 12:       else |
| 13:         evict batch b |
| 14:       end if |
| 15:     end if |
| 16:   end for |

The manager 340 may compute the batching schedule for each epoch of a job. In some examples, the manager 340 may compute a batching schedule for each of the workers 360, share the batching schedule with each worker along with metadata that specifies the location of each batch for the corresponding epoch; inform each worker about when to launch the prefetching threads; and inform each worker about the storage tier where a particular data batch is to be prefetched based on the memory and storage tiers available at the workers 360. A prefetcher at the workers 360 may use the information to proactively prefetch data batches and load them into the memory tiers. In some examples, the prefetched data set is shuffled across the nodes. In other examples, the prefetched data set is shuffled within the scope of a single worker. The flow of prefetched and cached data is described in more detail herein, including with reference to FIGS. 4 and 5.

The manager 340 may monitor the CXL memory allocations of the workers 360 and may accept workload requests for additional memory when an entire system memory has been consumed. The request for additional memory may be handled by the manager 340 by allocating memory in chunks of 512 MB. The manager 340 may allocate additional memory from the CXL memory space to avoid using swap space (e.g., SSD storage) when the entire system memory is in use. In some examples, the manager 340 estimates the memory requirement of a received job and allocates enough memory to allow for the model to grow over multiple training epochs. The manager 340 may also monitor a memory footprint of a job and allocate additional CXL memory if the system runs out of memory.

The manager 340 may also allocate fast scratch storage space using CXL-based storage. Allocating fast scratch storage may reduce input/output delays due to slower storage tiers in the data processing workflow. Additionally, or alternatively, intermediate data for the workload 305 may be stored in the fast scratch storage space—e.g., if there is not enough memory available to cache the data. Storing the intermediate data may significantly improve the performance of the job when, for example, a dataset is much larger than the available system memory and when processed data is written back to the local storage.

The prefetcher 335 may play a role in handling large datasets that are unable to fit entirely into a system memory. For some datasets, a size of a single batch becomes large enough to cause the core 320 to define large buffer sizes and to launch prefetching threads ahead of schedule. The prefetcher 335 may execute the prefetching schedule and report statistics back to the core 320 that is used to dynamically adjust prefetching buffer sizes and the number of prefetching threads—e.g., to improve input/output throughput.

The prefetcher 335 may also track the memory footprint of each sample as well as the size of an entire training batch, which the prefetcher 335 may use to determine the total size of a single prefetch block. The prefetcher 335 may use the total size of a single prefetch block to estimate a time for prefetching a batch from a particular data source. For network transfers, the available link bandwidth and latency may be included in the calculation to compute the estimated time to prefetch a batch.

The manager 340 may also define a caching policy that is followed by the workers 360 to provide quick access to training data that is not in the main memory. Techniques for caching data are described in more detail herein, including with reference to FIG. 5.

Figure 4:
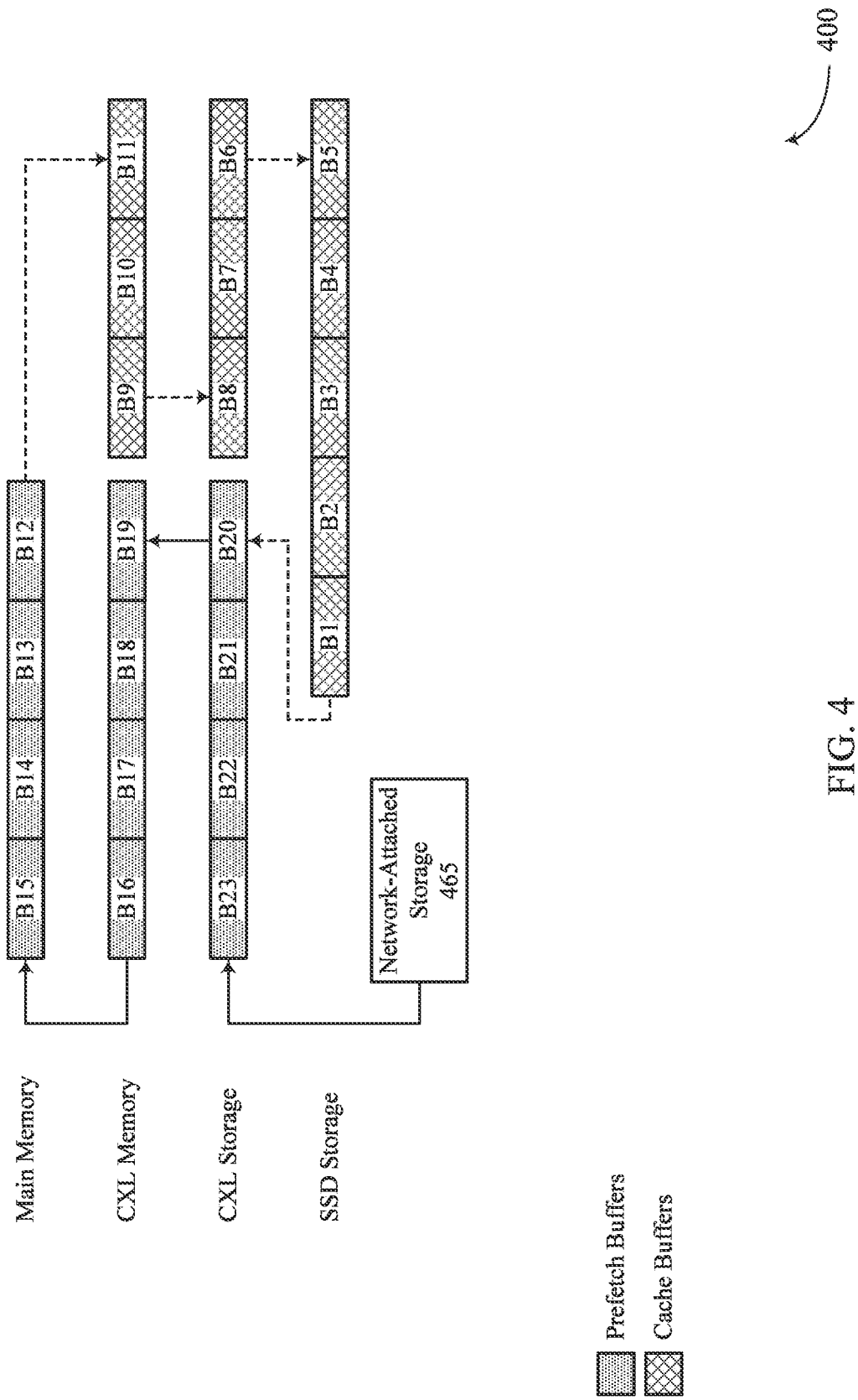
FIG. 4 shows an example of a data flow that supports loading data in a tiered memory system in accordance with examples as disclosed herein.

FIG. 4 shows an example data flow for loading data in a tiered memory system in accordance with examples as disclosed herein.

The data flow 400 may depict the movement of data from the network-attached storage 465 through prefetching buffers and cache buffers in accordance with a prefetching schedule and caching rules. The prefetching schedule may follow the following priorities for storing the prefetched data: 1) main memory; 2) CXL memory; 3) CXL storage; and 4) SSD storage. The priorities may be arranged in order of the fastest storage tier to the slowest storage tier. The prefetching schedule may work in accordance with the caching rules to coordinate data evictions to slower tiers of memory. The caching priority may traverse the prefetching priority in reverse order—e.g., so that the data to be processed remains available in the main memory. If a dataset, shard, or batch is significantly larger than the main memory, then the eviction coordination may be halted, and the memory resources may be fully allocated to prefetching buffers.

Figure 5:
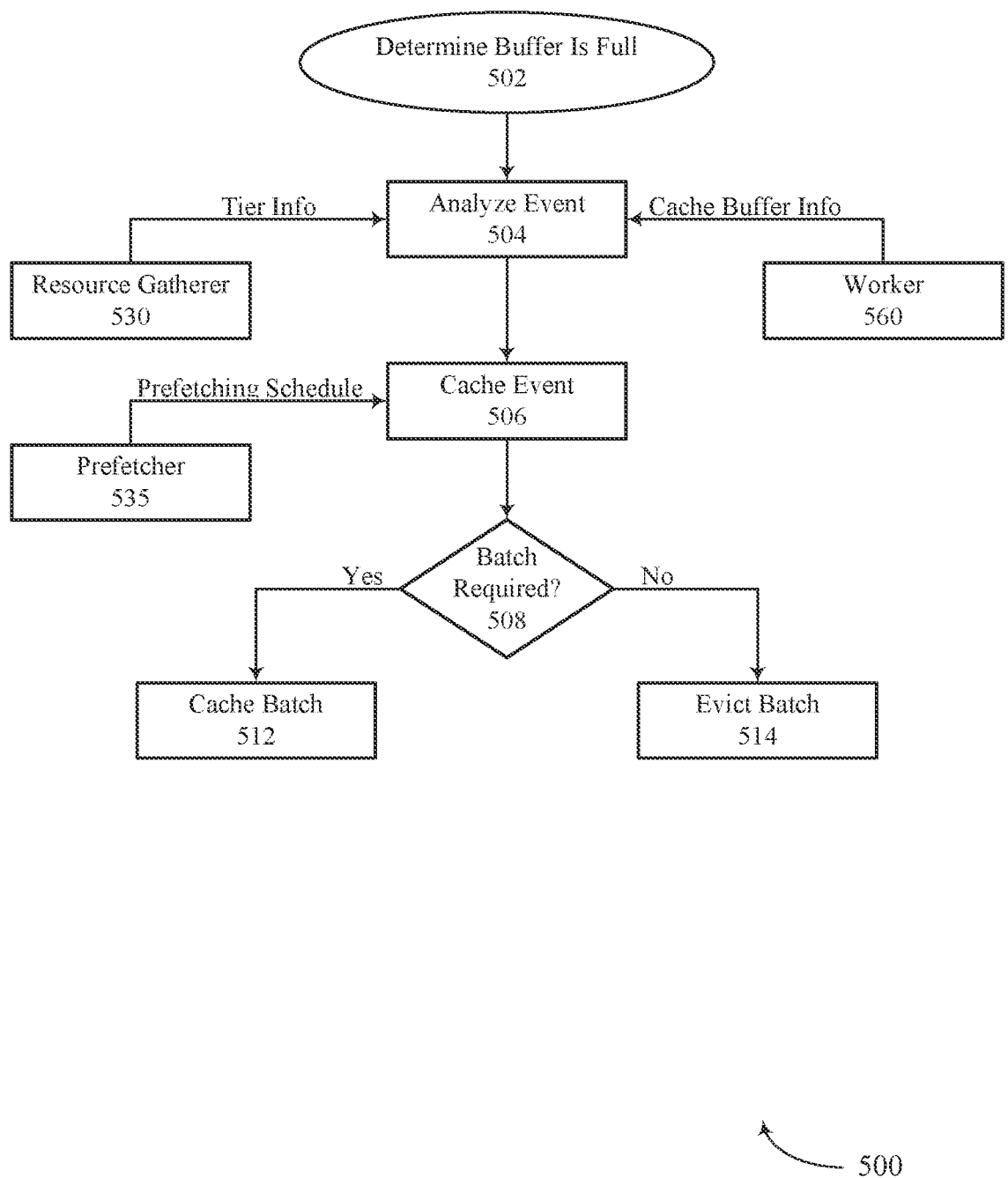
FIG. 5 shows an example of a set of operations for loading data in a tiered memory system in accordance with examples as disclosed herein.

FIG. 5 shows an example of a set of operations for loading data in a tiered memory system in accordance with examples as disclosed herein.

The flowchart 500 may be performed by the worker 560—e.g., in accordance with instructions provided by a manager. The worker 560 may be an example of a worker described herein. In some examples, the flowchart 500 may include operations for caching and evicting data at a node—e.g., to ensure quick access to training data that is not available in the main memory.

At 502, a determination that a buffer (e.g., a prefetching buffer) is full may be made (e.g., by the worker 560). In some examples, the determination may be made when an amount of available resources of the buffer is less than or equal to a threshold.

At 504, an analysis of the buffer may be performed (e.g., by the worker 560) to determine how to cache the data. The analysis may be based on information received from the resource gatherer 530 about the tiers of memory at the worker 560. The analysis may also be based on the cache buffer configured at the worker 560.

At 506, the event associated with the full buffer may be cached (e.g., by the worker 560). The worker 560 may also receive the prefetching schedule from the prefetcher 535. The prefetching schedule may provide a resource map for prefetching training data into the worker nodes.

At 508, a determination of whether the batch of data to be cached is to be used in subsequent training sessions may be made.

At 512, the batch of data may be stored in the cache based on determining that the batch of data is to be used again in the training procedure. The caching may be cached in accordance with the following rules received from a manager: (1) allow data to be cached when the buffers fill to a threshold value: (2) evict the cached data to a caching buffer in a first-in-first-out order: (3) cache the data from a higher tier to a lower tier of memory; and (4) continued caching to lower tiers in accordance with the prefetching schedule. In some examples, data that will be accessed again within a first duration is cached in the buffers of a second tier of memory (e.g., CXL memory) and when the buffers of the second tier of memory are full, the lower priority batches may be cached into the lower-performance memory tiers (e.g., SSD storage).

Certain operating systems (e.g., Linux systems) assume that cached data will be read again within a duration and evict data that has not been read within the duration. By caching the data as described, such an operating system may be prevented from evicting training data that is to be used in subsequent training sessions.

At 514, the batch of data may be evicted (e.g., deleted) based on determining that the batch of data is not scheduled to be used again in the training procedure.

To make space for new data in the buffers as the buffers reach capacity, the worker 560 may evict data in accordance with an eviction policy received from the manager. In some examples, data may be evicted from the cache in accordance with the following set of rules: (1) data samples are evicted in the same order they are received and (2) samples within a batch that are marked for prefetching in upcoming epochs will not be evicted and cached to a lower memory tier.

Figure 6:
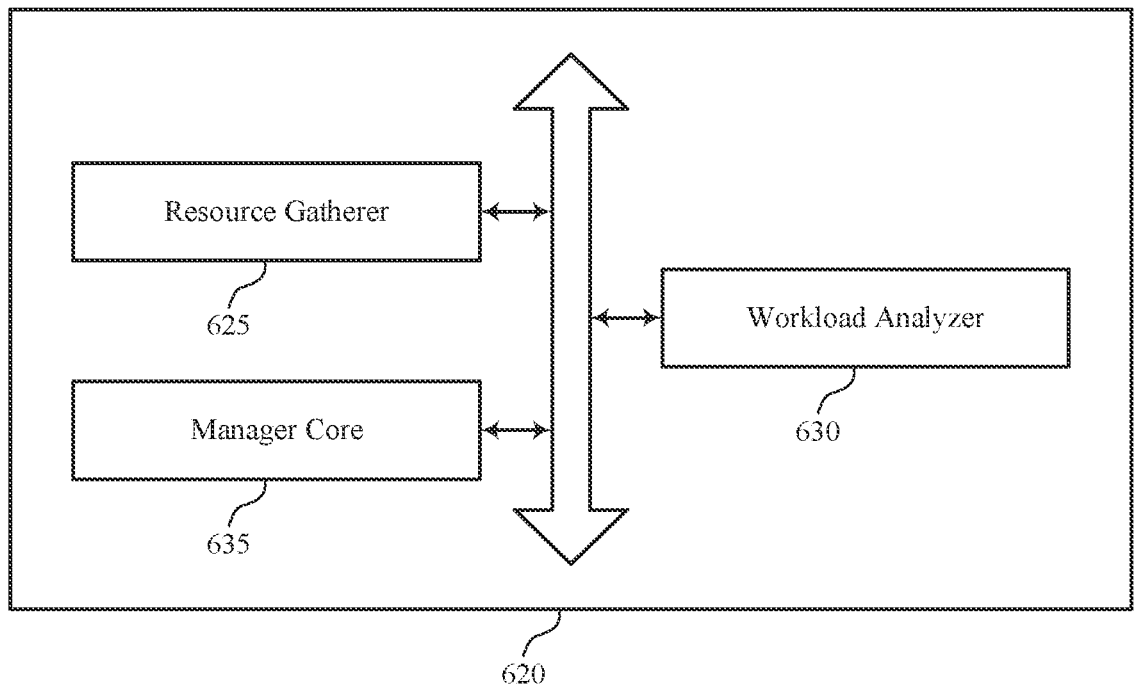
FIG. 6 shows a block diagram of a manager that supports loading data in a tiered memory system in accordance with examples as disclosed herein.

FIG. 6 shows a block diagram 600 of a manager 620 that supports loading data in a tiered memory system in accordance with examples as disclosed herein. The manager 620 may be an example of aspects of a manager as described with reference to FIGS. 1 through 5. The manager 620, or various components thereof, may be an example of means for performing various aspects of loading data in a tiered memory system as described herein. For example, the manager 620 may include a resource gatherer 625, a workload analyzer 630, a manager core 635, or any combination thereof. Each of these components may communicate, directly or indirectly, with one another (e.g., via one or more buses).

The resource gatherer 625 may be configured as or otherwise support a means for determining, for each node of a plurality of nodes in a cluster, a respective allocation of computing resources, where one or more nodes of the plurality of nodes include a plurality of tiers of memory. The workload analyzer 630 may be configured as or otherwise support a means for analyzing a data set to be processed by the plurality of nodes. The manager core 635 may be configured as or otherwise support a means for generating, for each node of the plurality of nodes, a respective set of data processing instructions based on the respective allocation of computing resources and a result of analyzing the data set, where the respective set of data processing instructions indicates a respective portion of the data set to be processed by a respective node and indicates a distribution of subsets of the respective portion of the data set across the plurality of tiers of memory at the respective node. In some examples, the manager core 635 may be configured as or otherwise support a means for sending, to respective nodes, the respective sets of data processing instructions and the respective portions of the data set based on the generating.

In some examples, the resource gatherer 625 may be configured as or otherwise support a means for determining, based on the respective allocation of computing resources at a node of the plurality of nodes, a performance metric for memory resources at the node. In some examples, the resource gatherer 625 may be configured as or otherwise support a means for separating the memory resources of the node into the plurality of tiers of memory based on the performance metric.

In some examples, the performance metric includes an achievable data rate, an input/output operation rate, a measured latency, or a combination thereof.

In some examples, sending the respective sets of data processing instructions includes sending, to a node of the plurality of nodes, a set of data processing instructions of the respective sets of data processing instructions directing the node to store a portion of the data set in a first tier of memory of the node and a second tier of memory of the node based on a performance metric of the first tier of memory and the performance metric of the second tier of memory being preferred over the performance metric of a third tier of memory of the node.

In some examples, the respective sets of data processing instructions further indicate rules for the respective node to cache the respective portion of the data set across the tiers of memory at the respective node.

In some examples, sending the respective sets of data processing instructions includes sending, to a node of the plurality of nodes, a set of data processing instructions of the respective sets of data processing instructions directing the node to cache data in a first tier of memory of the node based on a performance metric of the first tier of memory being preferred over the performance metric of a second tier of memory of the node.

In some examples, the workload analyzer 630 may be configured as or otherwise support a means for determining, based on analyzing the data set, a size of the respective portions of the data set and allocations of the respective portions of the data set to each node of the plurality of nodes.

In some examples, the manager core 635 may be configured as or otherwise support a means for designating, based on a respective allocation of computing resources at a node of the plurality of nodes and the result of analyzing the data set, a first buffer of a first size in a first tier of memory of the node, a second buffer of a second size in a second tier of memory of the node, and a third buffer of a third size in a third tier of memory of the node.

In some examples, the manager core 635 may be configured as or otherwise support a means for configuring, based on a TensorFlow application being initiated, a first node of the plurality of nodes as a managing node and a second node of the plurality of nodes as a worker node, where determining the allocation of computing resources, analyzing the data set, and generating the respective sets of data processing instructions is performed at the managing node.

In some examples, the data set includes training data for a deep learning model.

In some examples, the plurality of tiers of memory includes a first tier of memory including volatile memory configured as main memory for a central processing unit, a second tier of memory including volatile memory attached to the central processing unit via a compute express link, and a third tier of memory including non-volatile memory attached to the central processing unit via a second link.

Figure 7:
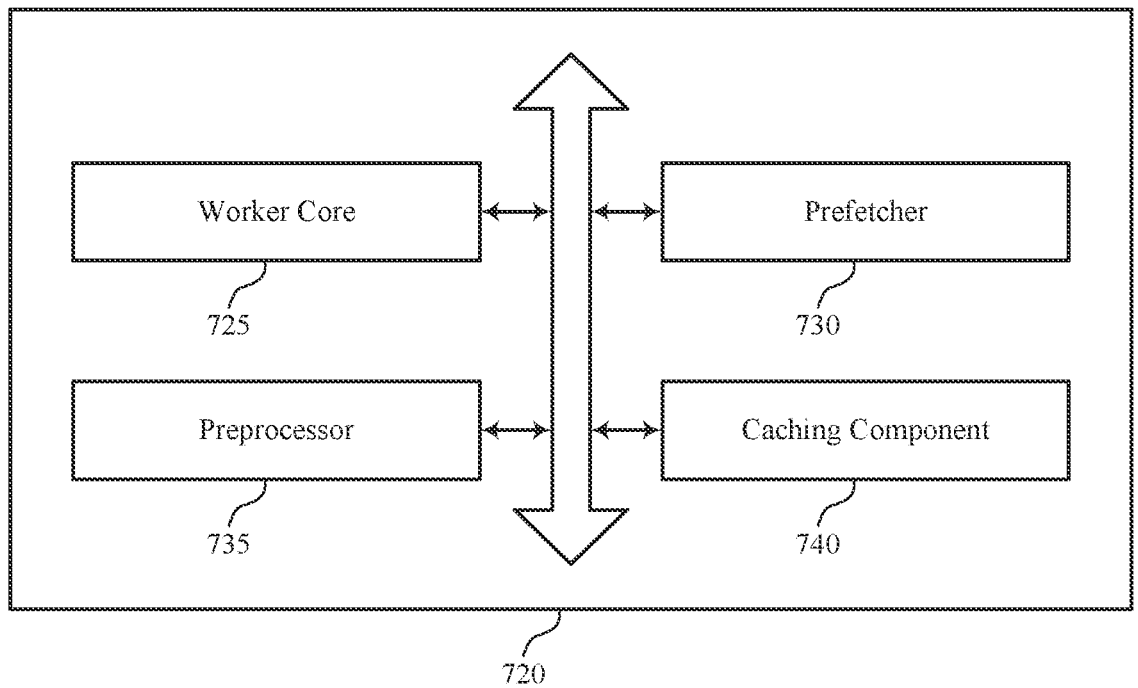
FIG. 7 shows a block diagram of a worker that supports loading data in a tiered memory system in accordance with examples as disclosed herein.

FIG. 7 shows a block diagram 700 of a worker 720 that supports loading data in a tiered memory system in accordance with examples as disclosed herein. The worker 720 may be an example of aspects of a worker as described with reference to FIGS. 1 through 5. The worker 720, or various components thereof, may be an example of means for performing various aspects of loading data in a tiered memory system as described herein. For example, the worker 720 may include a worker core 725, a prefetcher 730, a preprocessor 735, a caching component 740, or any combination thereof. Each of these components may communicate, directly or indirectly, with one another (e.g., via one or more buses).

The worker core 725 may be configured as or otherwise support a means for receiving a set of data processing instructions indicating a portion of a data set to be processed and indicating a distribution of subsets of the portion of the data set across a plurality of tiers of memory. The prefetcher 730 may be configured as or otherwise support a means for storing, in accordance with the set of data processing instructions, the subsets of the portion of the data set in corresponding tiers of memory of the plurality of tiers of memory. In some examples, the worker core 725 may be configured as or otherwise support a means for processing the subsets of the portion of the data set based on storing the subsets of the portion of the data set in the corresponding tiers of memory.

In some examples, to support processing the subsets of the portion of the data set, the preprocessor 735 may be configured as or otherwise support a means for preprocessing the subsets of the portion of the data set based on storing the subsets of the portion of the data set in the corresponding tiers of memory to obtain preprocessed data. In some examples, to support processing the subsets of the portion of the data set, the caching component 740 may be configured as or otherwise support a means for caching the preprocessed data in corresponding tiers of memory based on rules for caching the preprocessed data across the plurality of tiers of memory, the rules for caching the preprocessed data being included in the set of data processing instructions.

In some examples, the subsets of the portion of the data set being preprocessed are stored in a first tier of memory of the plurality of tiers of memory, and the caching component 740 may be configured as or otherwise support a means for determining that the preprocessed data is scheduled for processing within a threshold duration, where, based on the rules for caching the preprocessed data, the preprocessed data is stored in a second tier of memory of the plurality of tiers of memory.

In some examples, the worker core 725 may be configured as or otherwise support a means for establishing, based on the set of data processing instructions, a first buffer of a first size in a first tier of memory of the plurality of tiers of memory, a second buffer of a second size in a second tier of memory of the plurality of tiers of memory, and a third buffer of a third size in a third tier of memory of the plurality of tiers of memory.

In some examples, receiving, based on a TensorFlow application being initiated, a configuration as a worker node.

Figure 8:
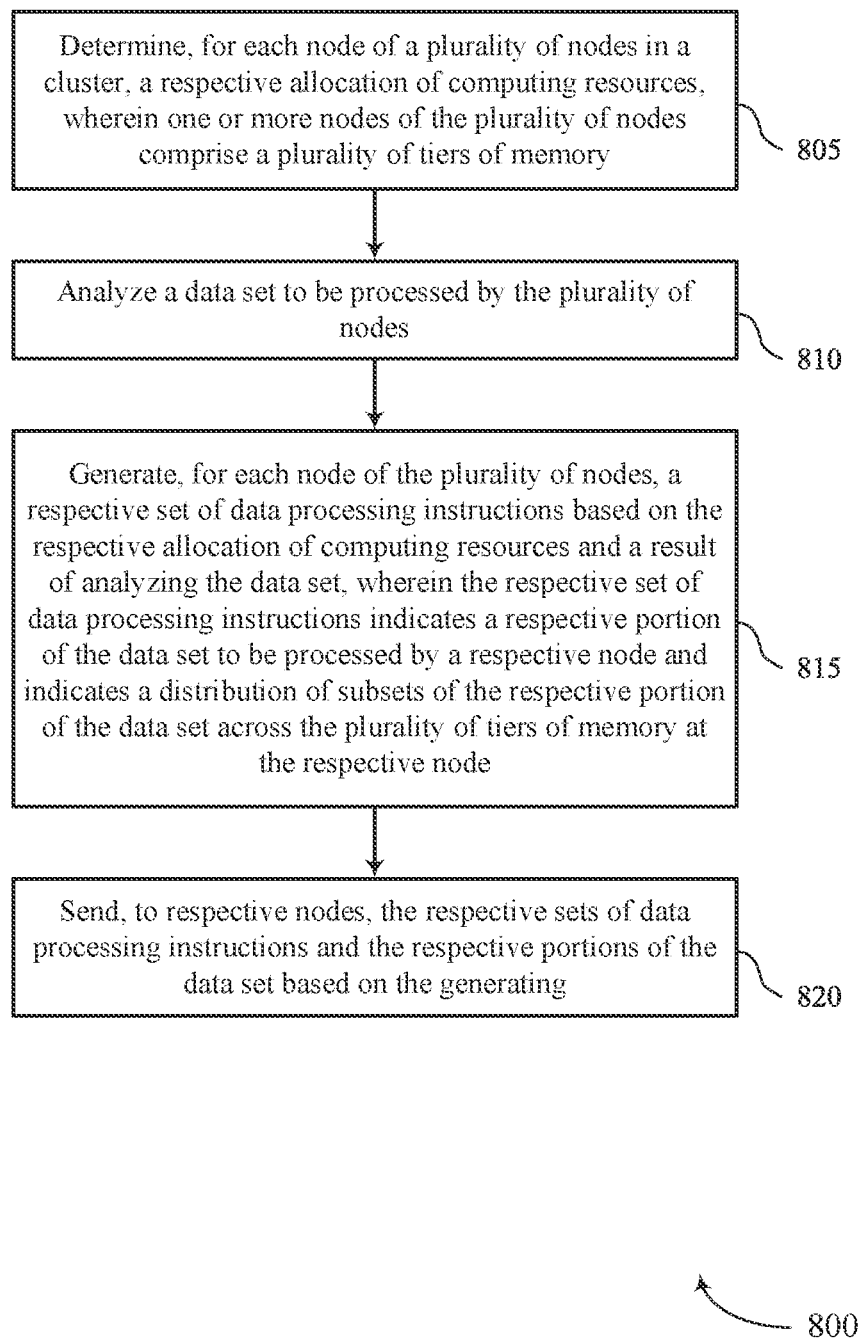
FIGS. 8 and 9 show flowcharts illustrating a method or methods that support loading data in a tiered memory system in accordance with examples as disclosed herein.

FIG. 8 shows a flowchart illustrating a method 800 that supports loading data in a tiered memory system in accordance with examples as disclosed herein. The operations of method 800 may be implemented by a manager or its components as described herein. For example, the operations of method 800 may be performed by a manager as described with reference to FIGS. 1 through 6. In some examples, a manager may execute a set of instructions to control the functional elements of the device to perform the described functions. Additionally, or alternatively, the manager may perform aspects of the described functions using special-purpose hardware.

At 805, the method may include determining, for each node of a plurality of nodes in a cluster, a respective allocation of computing resources, where one or more nodes of the plurality of nodes include a plurality of tiers of memory. The operations of 805 may be performed in accordance with examples as disclosed herein. In some examples, aspects of the operations of 805 may be performed by a resource gatherer 625 as described with reference to FIG. 6.

At 810, the method may include analyzing a data set to be processed by the plurality of nodes. The operations of 810 may be performed in accordance with examples as disclosed herein. In some examples, aspects of the operations of 810 may be performed by a workload analyzer 630 as described with reference to FIG. 6.

At 815, the method may include generating, for each node of the plurality of nodes, a respective set of data processing instructions based on the respective allocation of computing resources and a result of analyzing the data set, where the respective set of data processing instructions indicates a respective portion of the data set to be processed by a respective node and indicates a distribution of subsets of the respective portion of the data set across the plurality of tiers of memory at the respective node. The operations of 815 may be performed in accordance with examples as disclosed herein. In some examples, aspects of the operations of 815 may be performed by a manager core 635 as described with reference to FIG. 6.

At 820, the method may include sending, to respective nodes, the respective sets of data processing instructions and the respective portions of the data set based on the generating. The operations of 820 may be performed in accordance with examples as disclosed herein. In some examples, aspects of the operations of 820 may be performed by a manager core 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining, for each node of a plurality of nodes in a cluster, a respective allocation of computing resources, where one or more nodes of the plurality of nodes include a plurality of tiers of memory; analyzing a data set to be processed by the plurality of nodes; generating, for each node of the plurality of nodes, a respective set of data processing instructions based on the respective allocation of computing resources and a result of analyzing the data set, where the respective set of data processing instructions indicates a respective portion of the data set to be processed by a respective node and indicates a distribution of subsets of the respective portion of the data set across the plurality of tiers of memory at the respective node; and sending, to respective nodes, the respective sets of data processing instructions and the respective portions of the data set based on the generating.

Aspect 2: The method, apparatus, or non-transitory computer-readable medium of aspect 1, further including operations, features, circuitry, logic, means, or instructions, or any combination thereof for determining, based on the respective allocation of computing resources at a node of the plurality of nodes, a performance metric for memory resources at the node and separating the memory resources of the node into the plurality of tiers of memory based on the performance metric.

Aspect 3: The method, apparatus, or non-transitory computer-readable medium of aspect 2, where the performance metric includes an achievable data rate, an input/output operation rate, a measured latency, or a combination thereof.

Aspect 4: The method, apparatus, or non-transitory computer-readable medium of any of aspects 1 through 3, where sending the respective sets of data processing instructions includes sending, to a node of the plurality of nodes, a set of data processing instructions of the respective sets of data processing instructions directing the node to store a portion of the data set in a first tier of memory of the node and a second tier of memory of the node based on a performance metric of the first tier of memory and the performance metric of the second tier of memory being preferred over the performance metric of a third tier of memory of the node.

Aspect 5: The method, apparatus, or non-transitory computer-readable medium of any of aspects 1 through 4, where the respective sets of data processing instructions further indicate rules for the respective node to cache the respective portion of the data set across the tiers of memory at the respective node.

Aspect 6: The method, apparatus, or non-transitory computer-readable medium of any of aspects 1 through 5, where sending the respective sets of data processing instructions includes sending, to a node of the plurality of nodes, a set of data processing instructions of the respective sets of data processing instructions directing the node to cache data in a first tier of memory of the node based on a performance metric of the first tier of memory being preferred over the performance metric of a second tier of memory of the node.

Aspect 7: The method, apparatus, or non-transitory computer-readable medium of any of aspects 1 through 6, further including operations, features, circuitry, logic, means, or instructions, or any combination thereof for determining, based on analyzing the data set, a size of the respective portions of the data set and allocations of the respective portions of the data set to each node of the plurality of nodes.

Aspect 8: The method, apparatus, or non-transitory computer-readable medium of any of aspects 1 through 7, further including operations, features, circuitry, logic, means, or instructions, or any combination thereof for designating, based on a respective allocation of computing resources at a node of the plurality of nodes and the result of analyzing the data set, a first buffer of a first size in a first tier of memory of the node, a second buffer of a second size in a second tier of memory of the node, and a third buffer of a third size in a third tier of memory of the node.

Aspect 9: The method, apparatus, or non-transitory computer-readable medium of any of aspects 1 through 8, further including operations, features, circuitry, logic, means, or instructions, or any combination thereof for configuring, based on a TensorFlow application being initiated, a first node of the plurality of nodes as a managing node and a second node of the plurality of nodes as a worker node, where determining the allocation of computing resources, analyzing the data set, and generating the respective sets of data processing instructions is performed at the managing node.

Aspect 10: The method, apparatus, or non-transitory computer-readable medium of any of aspects 1 through 9, where the data set includes training data for a deep learning model.

Aspect 11: The method, apparatus, or non-transitory computer-readable medium of any of aspects 1 through 10, where the plurality of tiers of memory includes a first tier of memory including volatile memory configured as main memory for a central processing unit, a second tier of memory including volatile memory attached to the central processing unit via a compute express link, and a third tier of memory including non-volatile memory attached to the central processing unit via a second link.

Figure 9:
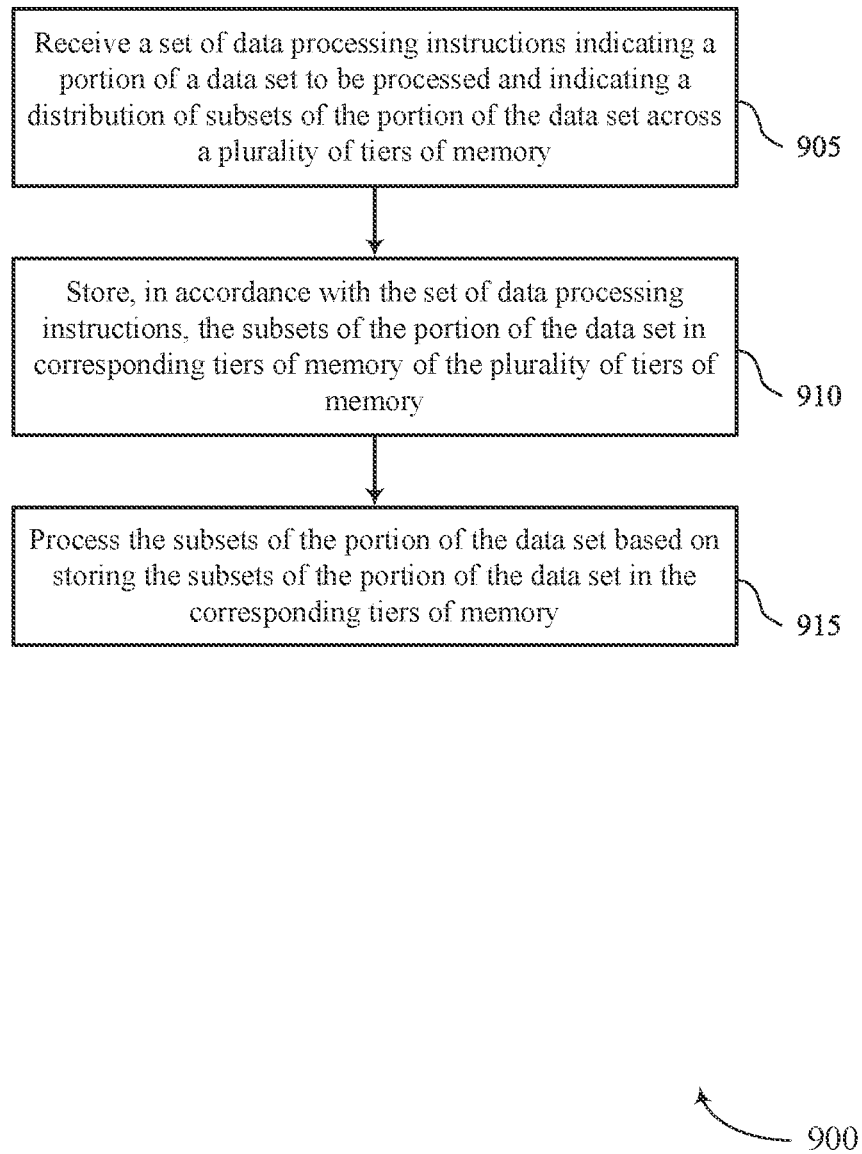

FIG. 9 shows a flowchart illustrating a method 900 that supports loading data in a tiered memory system in accordance with examples as disclosed herein. The operations of method 900 may be implemented by a worker or its components as described herein. For example, the operations of method 900 may be performed by a worker as described with reference to FIGS. 1 through 5 and 7. In some examples, a worker may execute a set of instructions to control the functional elements of the device to perform the described functions. Additionally, or alternatively, the worker may perform aspects of the described functions using special-purpose hardware.

At 905, the method may include receiving a set of data processing instructions indicating a portion of a data set to be processed and indicating a distribution of subsets of the portion of the data set across a plurality of tiers of memory. The operations of 905 may be performed in accordance with examples as disclosed herein. In some examples, aspects of the operations of 905 may be performed by a worker core 725 as described with reference to FIG. 7.

At 910, the method may include storing, in accordance with the set of data processing instructions, the subsets of the portion of the data set in corresponding tiers of memory of the plurality of tiers of memory. The operations of 910 may be performed in accordance with examples as disclosed herein. In some examples, aspects of the operations of 910 may be performed by a prefetcher 730 as described with reference to FIG. 7.

At 915, the method may include processing the subsets of the portion of the data set based on storing the subsets of the portion of the data set in the corresponding tiers of memory. The operations of 915 may be performed in accordance with examples as disclosed herein. In some examples, aspects of the operations of 915 may be performed by a worker core 725 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 12: A method, apparatus, or non-transitory computer-readable medium including operations, features, circuitry, logic, means, or instructions, or any combination thereof for receiving a set of data processing instructions indicating a portion of a data set to be processed and indicating a distribution of subsets of the portion of the data set across a plurality of tiers of memory; storing, in accordance with the set of data processing instructions, the subsets of the portion of the data set in corresponding tiers of memory of the plurality of tiers of memory: and processing the subsets of the portion of the data set based on storing the subsets of the portion of the data set in the corresponding tiers of memory.

Aspect 13: The method, apparatus, or non-transitory computer-readable medium of aspect 12, where processing the subsets of the portion of the data set includes operations, features, circuitry, logic, means, or instructions, or any combination thereof for preprocessing the subsets of the portion of the data set based on storing the subsets of the portion of the data set in the corresponding tiers of memory to obtain preprocessed data and caching the preprocessed data in corresponding tiers of memory based on rules for caching the preprocessed data across the plurality of tiers of memory, the rules for caching the preprocessed data being included in the set of data processing instructions.

Aspect 14: The method, apparatus, or non-transitory computer-readable medium of aspect 13, where the subsets of the portion of the data set being preprocessed are stored in a first tier of memory of the plurality of tiers of memory and the method, apparatuses, and non-transitory computer-readable medium further includes operations, features, circuitry, logic, means, or instructions, or any combination thereof for determining that the preprocessed data is scheduled for processing within a threshold duration, where, based on the rules for caching the preprocessed data, the preprocessed data is stored in a second tier of memory of the plurality of tiers of memory.

Aspect 15: The method, apparatus, or non-transitory computer-readable medium of any of aspects 13 through 14, further including operations, features, circuitry, logic, means, or instructions, or any combination thereof for establishing, based on the set of data processing instructions, a first buffer of a first size in a first tier of memory of the plurality of tiers of memory, a second buffer of a second size in a second tier of memory of the plurality of tiers of memory, and a third buffer of a third size in a third tier of memory of the plurality of tiers of memory.

Aspect 16: The method, apparatus, or non-transitory computer-readable medium of any of aspects 13 through 15, where receiving, based on a TensorFlow application being initiated, a configuration as a worker node.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 17: An apparatus, including: a processor; and memory storing instructions executable by the processor to cause the apparatus to: determine, for each node of a plurality of nodes in a cluster, a respective allocation of computing resources, where one or more nodes of the plurality of nodes includes a plurality of tiers of memory: analyze a data set to be processed by the plurality of nodes; generate, for each node of the plurality of nodes, a respective set of data processing instructions based on the respective allocation of computing resources and a result of analyzing the data set, where the respective set of data processing instructions indicates a respective portion of the data set to be processed by a respective node and indicates a distribution of subsets of the respective portion of the data set across tiers of memory at the respective node; and send, to respective nodes, respective sets of data processing instructions and respective portions of the data set based on the generating.

Aspect 18: The apparatus of aspect 17, where the instructions are further executable by the processor to cause the apparatus to: determine, based on the respective allocation of computing resources at a node of the plurality of nodes, a performance metric for memory resources at the node: and separate the memory resources of the node into the plurality of tiers of memory based on the performance metric.

Aspect 19: The apparatus of any of aspects 17 through 18, where, to send the respective sets of data processing instructions, the instructions are further executable by the processor to cause the apparatus to: send, to a node of the plurality of nodes, a set of data processing instructions of the respective sets of data processing instructions directing the node to store a portion of the data set in a first tier of memory of the node and a second tier of memory of the node based on a performance metric of the first tier of memory and the performance metric of the second tier of memory being preferred over the performance metric of a third tier of memory of the node.

Aspect 20: The apparatus of any of aspects 17 through 19, where, to send the respective sets of data processing instructions, the instructions are further executable by the processor to cause the apparatus to: send, to a node of the plurality of nodes, a set of data processing instructions of the respective sets of data processing instructions directing the node to cache data in a first tier of memory of the node based on a performance metric of the first tier of memory being preferred over the performance metric of a second tier of memory of the node.

Aspect 21: The apparatus of any of aspects 17 through 20, where the instructions are further executable by the processor to cause the apparatus to: determine, based on analyzing the data set, a size of the respective portions of the data set and allocations of the respective portions of the data set to each node of the plurality of nodes.

Aspect 22: The apparatus of any of aspects 17 through 21, where the instructions are further executable by the processor to cause the apparatus to: designate, based on the respective allocation of computing resources at a node of the plurality of nodes and the result of analyzing the data set, a first buffer of a first size in a first tier of memory of the node, a second buffer of a second size in a second tier of memory of the node, and a third buffer of a third size in a third tier of memory of the node.

Aspect 23: The apparatus of any of aspects 17 through 22, where the instructions are further executable by the processor to cause the apparatus to: configure, based on a TensorFlow application being initiated, a first node of the plurality of nodes as a managing node and a second node of the plurality of nodes as a worker node, where determining the allocation of computing resources, analyzing the data set, and generating the respective sets of data processing instructions is performed at the managing node.

An apparatus is described. The following provides an overview of aspects of the apparatus as described herein:

Aspect 24: An apparatus, including: a processor; and memory storing instructions executable by the processor to cause the apparatus to: receive a set of data processing instructions indicating a portion of a data set to be processed and indicating a distribution of subsets of the portion of the data set across a plurality of tiers of memory; store, in accordance with the set of data processing instructions, the subsets of the portion of the data set in corresponding tiers of memory of the plurality of tiers of memory; and process the subsets of the portion of the data set based on storing the subsets of the portion of the data set in the corresponding tiers of memory.

Aspect 25: The apparatus of aspect 24, where, to process the subsets of the portion of the data set, the instructions are further executable by the processor to cause the apparatus to: preprocess the subsets of the portion of the data set based on storing the subsets of the portion of the data set in the corresponding tiers of memory to obtain preprocessed data; and cache the preprocessed data in corresponding tiers of memory based on rules for caching the preprocessed data across the plurality of tiers of memory, the rules for caching the preprocessed data being included in the set of data processing instructions.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    determining, for each node of a plurality of nodes, a respective allocation of computing resources, wherein one or more nodes of the plurality of nodes comprise a plurality of tiers of memory;
    analyzing a data set to be processed by the plurality of nodes;
    generating, for each node of the plurality of nodes, a respective set of data processing instructions based on the respective allocation of computing resources and a result of analyzing the data set, wherein the respective set of data processing instructions indicates a respective portion of the data set to be processed by a respective node of the plurality of nodes and indicates a distribution of buffer sizes across the plurality of tiers of memory at the respective node for processing the respective portion of the data set; and sending, to respective nodes, respective sets of data processing instructions and respective portions of the data set.

2. The method of claim 1, further comprising:

determining, based on the respective allocation of computing resources at a node of the plurality of nodes, a performance metric for memory resources at the node; and separating the memory resources of the node into the plurality of tiers of memory based on the performance metric.

3. The method of claim 2, wherein the performance metric comprises an achievable data rate, an input/output operation rate, a measured latency, or a combination thereof.

4. The method of claim 1, wherein sending the respective sets of data processing instructions comprises:

sending, to a node of the plurality of nodes, a set of data processing instructions of the respective sets of data processing instructions directing the node to store a portion of the data set in a first tier of memory of the node and a second tier of memory of the node based on a performance metric of the first tier of memory and the performance metric of the second tier of memory being preferred over the performance metric of a third tier of memory of the node.

5. The method of claim 1, wherein the respective sets of data processing instructions further indicate:

rules for the respective node to cache the respective portion of the data set across the plurality of tiers of memory at the respective node.

6. The method of claim 1, wherein sending the respective sets of data processing instructions comprises:

sending, to a node of the plurality of nodes, a set of data processing instructions of the respective sets of data processing instructions directing the node to cache data in a first tier of memory of the node based on a performance metric of the first tier of memory being preferred over the performance metric of a second tier of memory of the node.

7. The method of claim 1, further comprising:

determining, based on analyzing the data set, a size of the respective portions of the data set and allocations of the respective portions of the data set to each node of the plurality of nodes.

8. The method of claim 1, further comprising:

designating, based on a determined allocation of computing resources at a node of the plurality of nodes and the result of analyzing the data set, a first buffer of a first size in a first tier of memory of the node, a second buffer of a second size in a second tier of memory of the node, and a third buffer of a third size in a third tier of memory of the node.

9. The method of claim 1, further comprising:

configuring, based on a TensorFlow application being initiated, a first node of the plurality of nodes as a managing node and a second node of the plurality of nodes as a worker node, wherein determining the respective allocation of computing resources, analyzing the data set, and generating the respective sets of data processing instructions is performed at the managing node.

10. The method of claim 1, wherein the data set comprises training data for a deep learning model.

11. The method of claim 1, wherein the plurality of tiers of memory comprises:

a first tier of memory comprising volatile memory configured as main memory for a central processing unit, a second tier of memory comprising volatile memory attached to the central processing unit via a compute express link, and a third tier of memory comprising non-volatile memory attached to the central processing unit via a second link.

12. A memory system, comprising:

processing circuitry; and memory storing instructions executable by the processing circuitry to cause the memory system to:

determine, for each node of a plurality of nodes, a respective allocation of computing resources, wherein one or more nodes of the plurality of nodes comprise a plurality of tiers of memory;

analyze a data set to be processed by the plurality of nodes;

generate, for each node of the plurality of nodes, a respective set of data processing instructions based on the respective allocation of computing resources and a result of analyzing the data set, wherein the respective set of data processing instructions indicates a respective portion of the data set to be processed by a respective node of the plurality of nodes and indicates a distribution of buffer sizes across the plurality of tiers of memory at the respective node for processing the respective portion of the data set; and send, to respective nodes, respective sets of data processing instructions and respective portions of the data set.

13. The memory system of claim 12, wherein the instructions are further executable by the processing circuitry to cause the memory system to:

determine, based on the respective allocation of computing resources at a node of the plurality of nodes, a performance metric for memory resources at the node; and separate the memory resources of the node into the plurality of tiers of memory based on the performance metric.

14. The memory system of claim 12, wherein, to send the respective sets of data processing instructions, the instructions are further executable by the processing circuitry to cause the memory system to:

send, to a node of the plurality of nodes, a set of data processing instructions of the respective sets of data processing instructions directing the node to store a portion of the data set in a first tier of memory of the node and a second tier of memory of the node based on a performance metric of the first tier of memory and the performance metric of the second tier of memory being preferred over the performance metric of a third tier of memory of the node.

15. The memory system of claim 12, wherein, to send the respective sets of data processing instructions, the instructions are further executable by the processing circuitry to cause the memory system to:

send, to a node of the plurality of nodes, a set of data processing instructions of the respective sets of data processing instructions directing the node to cache data in a first tier of memory of the node based on a performance metric of the first tier of memory being preferred over the performance metric of a second tier of memory of the node.

16. The memory system of claim 12, wherein the instructions are further executable by the processing circuitry to cause the memory system to:
  determine, based on analyzing the data set, a size of the respective portions of the data set and allocations of the respective portions of the data set to each node of the plurality of nodes.

17. The memory system of claim 12, wherein the instructions are further executable by the processing circuitry to cause the memory system to:
  designate, based on a determined allocation of computing resources at a node of the plurality of nodes and the result of analyzing the data set, a first buffer of a first size in a first tier of memory of the node, a second buffer of a second size in a second tier of memory of the node, and a third buffer of a third size in a third tier of memory of the node.

18. The memory system of claim 12, wherein the instructions are further executable by the processing circuitry to cause the memory system to:
  configure, based on a TensorFlow application being initiated, a first node of the plurality of nodes as a managing node and a second node of the plurality of nodes as a worker node, wherein determining the respective allocation of computing resources, analyzing the data set, and generating the respective sets of data processing instructions is performed at the managing node.

* * * * *